INVENTORS
GLENN T. McCLURE
THOMAS F. HURSEN
BY
A. A. Steinmiller
ATTORNEY

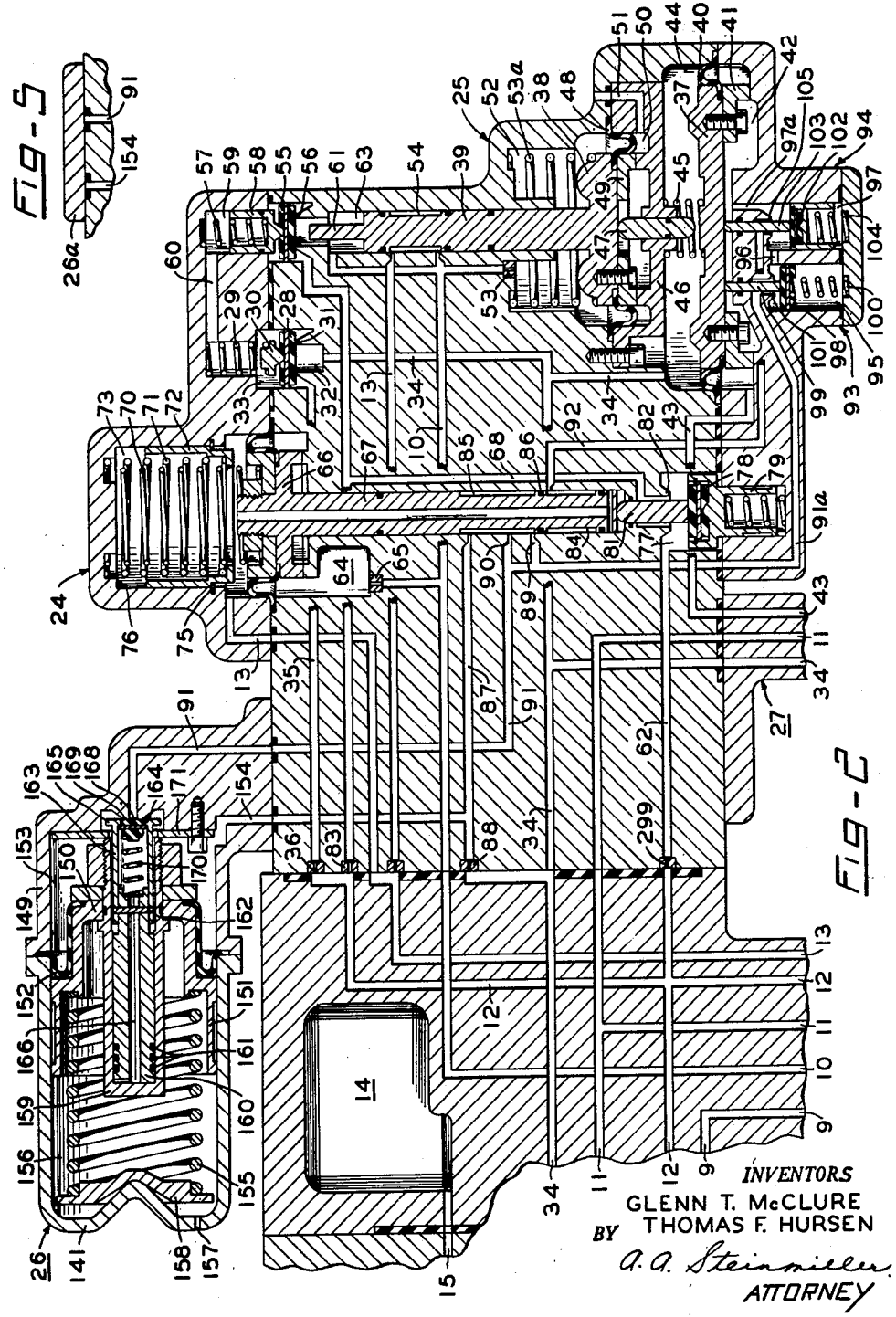

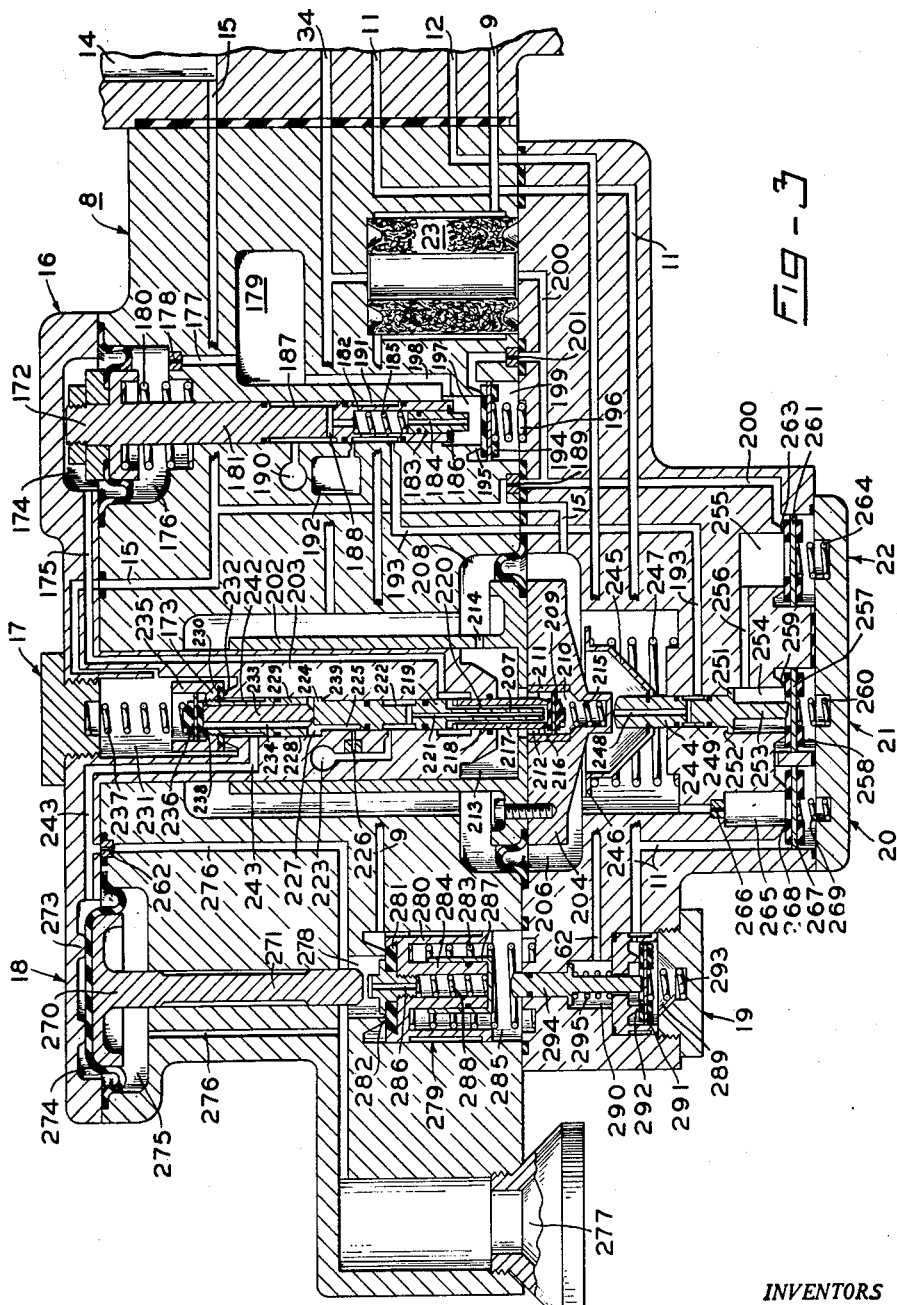

United States Patent Office 3,160,447
Patented Dec. 8, 1964

3,160,447
RAILWAY BRAKE CONTROL VALVE DEVICE WITH CONTINUAL QUICK SERVICE FEATURE
Glenn T. McClure, McKeesport, and Thomas F. Hursen, Pitcairn, Pa., assignors to Westinghouse Air Brake Company, Wilmerding, Pa., a corporation of Pennsylvania
Original application Oct. 30, 1961, Ser. No. 148,425. Divided and this application Mar. 18, 1964, Ser. No. 352,750
4 Claims. (Cl. 303—83)

This invention relates to brake control valve devices for railway cars and more particularly, to fluid pressure brake control valve devices of the graduated application and graduated release type, the present invention being primarily concerned with the provision of so-called continual quick service means adapting such brake controlling valve devices for effecting repeated and successive quick service reductions in the pressure of the brake pipe with each successive increment or step in graduated application of the brakes. The present application is a division of the prior copending application Serial No. 148,425, filed October 30, 1961.

Freight transportation by railway trains is fast undergoing a radical change, both in the form of handling the freight, and the speed with which it is handled. The freight lading is handled so as to avoid shock damage to even the most fragile of freight lading, yet is transported at a speed equal to passenger train schedules. To safely handle such trains it is essential that the brake control valve devices on the cars be immediately responsive to the reception of and the degree of brake pipe pressure variations and to assist in near instantaneous transmission of such brake pipe pressure variations through the train.

To accomplish this end and according to the present invention, we provide a new and improved freight car brake controlling valve device capable of graduated control of the brakes in small increments both for brake application and brake release determined respectively by increments of variation of brake pipe pressure both by brake pipe pressure reductions and brake pipe pressure increases.

It is realized that during the transition period of changeover from the present direct release brake equipment, such as the present AB brake equipment, to trains having a major percentage of the cars in a train equipped with this new brake control device, this new control valve must operate compatibly with the present direct release brake equipment. Furthermore, the freedom from shock caused by slack transfer through the train both when making the brake application and when making the brake release is realized by transmitting the brake control pipe variations through the brake pipe from car to car, serially, at a rate exceeding the rate of transfer of slack.

It is accordingly the principal object of the present invention to provide a brake control valve device having a novel type of "continual" quick service arrangement which is operative repeatedly with each successive brake pipe pressure reduction over the entire service application range of brake pipe pressure reductions to effect the service application of the brakes on the cars to assist in the reducing of brake pipe pressure and to accelerate the transmission of the brake pipe pressure reduction to all cars in the train.

The novel brake controlling valve device includes a so-called quick service and emergency portion including a quick service and emergency valve device and a co-operating continual quick service valve device which function cooperatively to effect a so-called continual quick service operation by repeated reduction of brake pipe pressure to a quick service volume upon each successive reduction of brake pipe pressure, the quick service volume being vented to atmosphere between successive quick service operations.

Other objects and advantages of the present invention will be made apparent from the following detailed description of the invention and from the accompanying drawings wherein sheets 1, 2 and 3 constitute a complete diagrammatic view of one embodiment of a railway brake control valve device including the features of improvement of this invention. In particular:

FIG. 2 is an enlarged cross-sectional diagrammatic view of the service portion of the control valve device illustrated in FIG. 1 and a partial cross-sectional view of the pipe bracket portion.

FIG. 3 is an enlarged cross-sectional diagrammatic view of the emergency portion of the control valve of FIG. 1, and a partial cross-sectional view of the pipe bracket portion along the mating edges.

FIG. 5 is a partial section view of the service portion of the control valve device of FIG. 2 showing the direct release valve device removed and replaced by a cover plate.

Figures 1, 4:
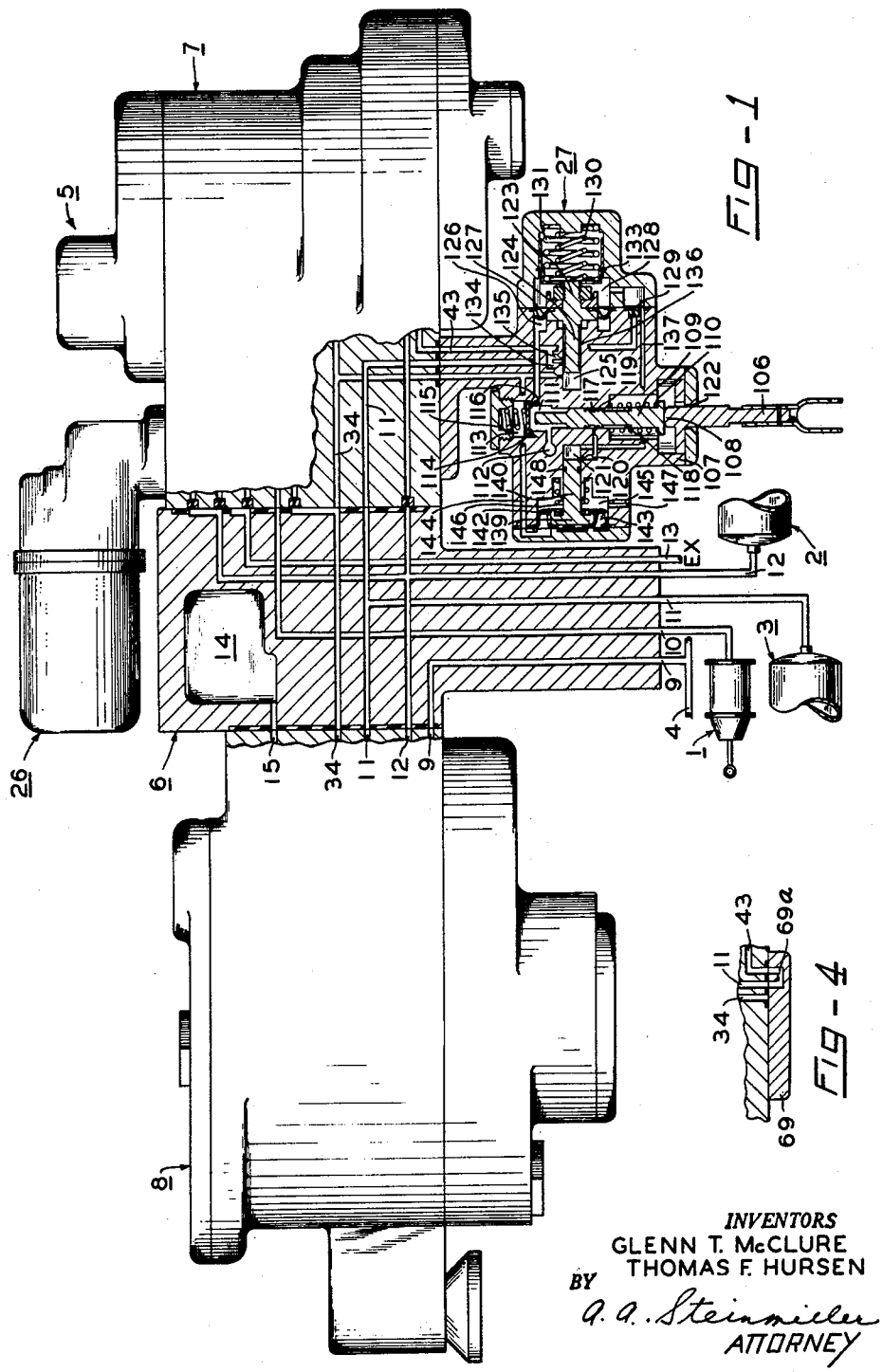
FIG. 1 is a diagrammatic view of a fluid pressure brake apparatus including the control valve device embodying the present invention and showing the pipe bracket portion and the manual brake release device in cross section.
FIG. 4 is a partial section view of the service portion of the control valve device of FIG. 1 showing the manual brake release device removed and replaced by a cover plate.

Referring to FIG. 1 of the drawings, the improved fluid pressure brake control apparatus comprises the brake cylinder device 1, which is responsive to the degree of build-up or reduction in pressure of fluid supplied thereto to effect a corresponding degree of braking of the wheels on a railway vehicle through the medium of the usual brake rigging and brake shoes (not shown); a normally charged auxiliary reservoir 2 from which fluid under pressure is supplied to the brake cylinder device 1 during both service and emergency applications of the brakes on the vehicle; normally charged emergency reservoir 3 from which fluid under pressure is supplied to the brake cylinder device during an emergency application of the brakes; the usual normally charged brake pipe 4 extending through the train of cars and the pressure in which is under the control of an engineer's brake valve device (not shown) located on the locomotive of the train; and a brake controling valve device 5 for each car of the train controlled responsively to variation of fluid pressure in said brake pipe.

The brake controlling valve device 5 comprises a pipe bracket portion 6 to the opposite faces of which there is secured in sealed relation therewith, a service application valve portion 7 and an emergency application portion 8, respectively.

The pipe bracket portion 6 includes passageways 9, 10, 11, 12 and 13 connected respectively to the brake pipe 4, brake cylinder device 1, emergency reservoir 3, auxiliary reservoir 2, and to the exhaust. Formed in the upper section of the pipe bracket 6 is a quick action chamber 14 for storing fluid to be supplied to the emergency portion 7 via passageway 15.

The emergency portion 8 comprises generally (see FIG. 2) a continual quick service valve device 16, a quick service and emergency pilot valve device 17, a vent valve device 18, a high pressure valve device 19, a spill-over check valve device 20, a back-dump check valve device 21, a back-flow check valve device 22, and a brake pipe strainer 23.

The service portion 6, see sheet 3, comprises generally an inshot valve device 24 and a service valve device 25. Detachably fastened on the upper and lower faces, respectively, of the service portion 6 are a direct release valve device 26 and a manual brake cylinder release device 27 (FIG. 1). Both the direct release valve device and the manual release valve device may be omitted if desired. When omitted, cover plates 26a and 69 are substituted instead, as is more fully explained hereinafter.

To provide for substantial charging and recharging of the auxiliary reservoir 2, the service portion 7 is provided with an auxiliary reservoir charging check valve device which includes a check valve 28 urged by a light biasing spring 29 through a follower 30 into seated relation on a valve seat 31 to permit only one-way flow between a fluid pressure inlet chamber 32 and an outlet chamber 33. The inlet chamber 32 is in constant open communication with the brake pipe 4 by way of brake pipe branch passageway 34, brake pipe strainer 23 (sheet 3) and brake pipe passageway 9. The outlet chamber 33 is in constant communication with the auxiliary reservoir 2 by way of auxiliary branch passageway 35, auxiliary reservoir charging choke 36 located in the passageway 35 and passageway 12.

During initial charging and during recharging of the auxiliary reservoir, whenever the pressure of fluid in the brake pipe 4 exceeds the pressure of fluid in the auxiliary reservoir 2 sufficient to unseat the check valve 28 against the opposition of the light bias spring 29, fluid under pressure flows from the brake pipe 4 to the auxiliary reservoir 2 by way of the passageways 9 and 34, inlet chamber 32, the unseated check valve 28, outlet chamber 33, passageway 35 and charging choke 36 located in the passageway 35 and passageway 12 to charge the auxiliary reservoir 2 to substantially brake pipe pressure.

The service valve device 25 serves to control the supply of fluid under pressure from the auxiliary reservoir 2 to the brake cylinder device 1 during the brake application and from the brake cylinder to the atmosphere during the release operation of brakes and is constructed to be responsive to variations in brake pipe pressure, to be movable to a service position, a lap position, and a brake release position. The service valve device 25 comprises a pair of operatively connected motor pistons 37 and 38 of which the motor piston 38 is connected to the lower end of a valve stem 39.

The motor piston or equalizing piston 37 includes an annular flexible diaphragm 40 clamped adjacent its outer periphery between casing sections and adjacent its inner periphery between a diaphragm follower 41 and the piston 37. The diaphragm 40 is subject on one side to a pressure of fluid in a control chamber 42 having fluid under pressure at a datum value supplied thereto from the emergency reservoir 3 via passageway 43, as more fully to be explained hereinafter. On its opposite side the diaphragm 40 is subject to the pressure of fluid in a brake pipe chamber 44 which is constantly open to the brake pipe 4 by way of brake pipe passageway 34 and to the force of a biasing spring 45 disposed between a partitioning wall 46 and the equalizing piston 37. Upon a differential in pressure between the opposite faces of the equalizer piston 37 as determined by the brake pipe pressure in the brake pipe chamber 44, and the datum pressure in the control chamber 42, the follower assembly 41 is moved in the direction of lesser pressure.

Operatively connecting the equalizer piston 37 with the motor piston 38 is a pin 47 slidably and sealably mounted in the partition 46. The lower end of the pin 47 contacts the piston assembly 37 and during upward movement of the latter, upon a reduction of fluid under pressure in the brake pipe chamber 44, the upper end contacts the motor piston 38 to move the latter upwardly.

The motor piston 38 includes an annular diaphragm 48 suitably clamped adjacent its outer edges between casing sections and adjacent its inner edges between a follower 49 and the piston 38. The diaphragm 48 is subject on one side to pressure in a chamber 50 which is constantly open to atmosphere via a passageway 51 and on its opposite side to pressure in chamber 52 corresponding to the pressure in the brake cylinder device 1 supplied thereto via passageway 10 and choke 53 and to the force of a spring 53a. In this connection, it is to be noted that the cross-sectional area of the motor piston 38 and the motor piston 37 are sized relatively to each other such that when the pressure of fluid in the chamber 52 is approximately 2½ times the reduction in fluid pressure in the brake pipe chamber 44 below the control pressure in the chamber 42, the stem 39 and motor piston 38 are moved downwardly and by way of the pin 47 moves the equilizer piston 37 downwardly into a lap position.

The stem 39 is sealingly slidable within the casing and is formed with an annular groove 54 which, as shown in FIG. 2, illustrating the relative positions of the service valve in brake release position, is located and arranged such that the brake cylinder passageway 10 and the exhaust passageway 13 are in communication and in this manner to vent the brake cylinder device 1 to atmosphere. In the service position and the lap position of the stem 39, the groove 54 is located relatively to the brake cylinder and exhaust passageways 10 and 13 such that the brake cylinder passageway 10 is located outside of the confines of the groove 54 and thereby to cut off communication between the two passageways.

For supplying fluid under pressure to the brake cylinder device 1 from the auxiliary reservoir 2, there is provided a one-way check valve device including a check valve 55 which is seatable on a valve seat 56 formed on the casing adjacent the upper end of the stem 39. The check valve 55 is held seated by the force of a biasing spring 57 arranged in a follower piston 58 sealingly slidable in a chamber 59 and the pressure of fluid in the auxiliary reservoir 2 supplied thereto via passageway 60 communicating with the outlet chamber 33, passageway 35, choke 36 and passage 12.

Upon movement of the service valve device 25 to service position, an upper end 61 of the stem 39 which is of reduced diameter, unseats the check valve 55 to provide communication between the auxiliary reservoir 2 via auxiliary reservoir passageway 12, a service choke 83 and a passageway 12 and also by way of a choke 299 and an auxiliary reservoir branch passageway 62 in which there is located an inshot check valve device 78 operative in a manner to be more fully described hereinafter, and passageway 68 to an outlet chamber 63 in constant communication with the brake cylinder device 1 via brake cylinder passageway 10. The brake cylinder passageway 10 also communicates with the chamber 52 via the charging choke 53 and also with an inshot chamber 64 of the inshot valve device 24 via charging choke 65.

The inshot valve device includes a diaphragm type motor piston assembly 66 having a valve stem 67 sealably and slidably mounted in the casing. The piston assembly 66 is subject opposingly on one side to the pressure of the fluid in the inshot chamber 64 charged therein as explained above via brake cylinder passage 10 and on the other side to the force of a biasing spring 70 and a biasing spring 71 disposed in a cage 72. The spring 70 and caged spring 71 are located in a chamber 73 constantly vented to atmosphere via the exhaust passageway 13. The cage 72 carried by the spring 71 is slidably movable in the chamber for limited downward movement by a snap ring 75 and limited upward movement by a shoulder 76 in the top wall of the chamber. The spring 70 is arranged to yield under a lesser force than the spring 71 such that during the build-up of pressure of fluid in the chamber 64 as determined by the charging choke 65 during the initial phase of the service application of brakes the spring 70 yields whereupon the piston assembly 66 abuts the cage 72. When the pressure within the chamber 64 is of a selective magnitude, the spring 71 is also compressed such that the cage 72 abuts the shoulder 76 and the lower end of the stem 67 is elevated to its upper limit of travel.

Associated with the lower end of the stem 67 is an inshot check valve device 78 located in a chamber 77 formed in the auxiliary branch passageway 62–68 for controlling the supply of the fluid under pressure therethrough. The inshot check valve device 78 is urged by a follower piston 79 and a biasing spring into contact with the lower end of a pin 81 sealingly and slidably mounted in the casing and in abutting contact at its upper end with the lower end of the inshot valve stem 67. The inshot check valve device 78 is seatable on a valve seat 82 disposed in the auxiliary pressure branch passageway 62–68.

In the release position of the inshot valve device valve, as shown, in which the inshot chamber 64 is vented to atmosphere via the choke 65, passageway 10, annular groove 54 and exhaust passageway 13, the spring 70 urges the piston 66 and stem 67 into its lower limit position thereby to unseat the inshot check valve device 78 from the valve seat 82 by way of the pin 81 thereby to maintain the auxiliary reservoir branch passageway 62–68 open.

During initial charging of the brake cylinder 1 with fluid under pressure and an initial charging of the inshot valve chamber 64 so that only the spring 70 is compressed, the piston assembly 66 abuts the cage 72 and the stem 67 is elevated a corresponding amount and the check valve device 78 is biased toward the valve seat 82, but is not seated on the latter until the pressure of fluid in the inshot valve chamber 64 is of a selective greater magnitude sufficiently to overcome spring 71 whereupon the inshot check valve device 78 seats on the valve seat 82 to cut off further flow of pressure through the passageway 62–68. However, fluid under pressure from the auxiliary reservoir 2 continues to flow to the chamber 63 via passageway 12 and a choke 83.

Formed in the stem 67 are a pair of spaced annular grooves 84 and 85 separated by an O-ring 86. In the release position of the inshot valve device, the groove 85 is arranged to provide communication between the brake pipe passageway 34 via branch passageway 87 containing choke 88 and a pair of branch passages 89 and 90 of a direct release passageway 91. The groove 84 is arranged to be aligned with one end of a passageway 92 operatively associated with the control chamber 42. Upon movement of the inshot valve device to the position in which the follower assembly abuts the cage 72, the O-ring 86 is located between the passageways 89 and 90 so that the passageways 89 and 90 communicate via the groove 84 with the passageway 92. Upon further upward or limit movement of the inshot valve device 24, both direct release branch passageways 89 and 90 are aligned with groove 84 and passageway 92. Groove 85 is positioned above passageway 90 thereby to disconnect passageway 90 from passageway 87.

Referring back to the service valve device 25, adjacent the control chamber 42 are a pair of interlocking check valve devices 93 and 94. The check valve device 93 is located in a chamber 95 and serves as an emergency reservoir charging check valve, as more fully to be explained hereafter, and controls the flow of fluid under pressure from the passageway 91a via chamber 95 to a passageway 96 that is in constant communication with a chamber 97 and, via a passage 97a, with the control chamber 42. The emergency reservoir charging check valve device 93 includes a check valve 98 having an upwardly extending stem 99 sealably slidable in the casing and a biasing spring 100 urging the stem 99 into contact with the underside of the equalizer piston 37. Upon a decrease in brake pipe pressure in the chamber 44 when the equalizer piston 37 moves toward service position and engages pin 47, the check valve 98 is biased into seating contact with a seat 101 thereby to shut off further communication between passageway 91a and the control chamber 42.

The check valve device 94 is located in the chamber 97 and serves to provide an interlock between the movement of the inshot valve device into its different positions during the supply and release of fluid under pressure to and from the brake cylinder device, as more fully to be described hereinafter. The check valve device includes a check valve 102 having a stem 103 sealably slidable in the casing and is urged by a rider and a light biasing spring 104 into contact with the underside of the equalizing piston so as to be movably responsive therewith. Upon movement of the equalizing piston 37 into service position, the check valve 102 is arranged so as to seat on a seat 105 and thereby close off communication between the passageway 92 and the control chamber 42. It is to be noted that the stems 99 and 103 are such that check valve 102 is seated only in service position of the equalizing piston 37 and check valve 98 is unseated in the release position of said service piston.

The manual brake cylinder release portion 27, FIG. 1, serves to permit a manual release of brake cylinder pressure without recharging the brake pipe and to release the fluid under pressure from both the auxiliary and emergency reservoirs when it is desired to service the brake equipment such as to replace brake shoes, repair brake rigging or service the brake cylinder device 1. The brake cylinder release portion includes a handle 106 rockably mounted in a normal position in a housing 107 and having a camming surface 108 arranged to contact the lower end of a spool valve 109 held biased against the camming surface 108 by a spring 110 to elevate the upper end of the spool valve 109 upon movement of the handle 106 in any direction from its normal position, as shown. The upper end of the spool valve is of somewhat lesser diameter and is located in a chamber 111 constantly vented to atmosphere via port 112 and separated from a chamber 113 that is in constant communication with the emergency reservoir 3 via passageway 11. A check valve 114 is located in chamber 113 and is held biased by a biasing spring 115 on a seat 116. Upon movement of the handle in any direction from the position in which it is shown, the camming surface is arranged to elevate the spool valve 109 thereby to unseat the check valve 114 so that fluid under pressure from the emergency reservoir 3 via passageway 11 is vented to atmosphere by way of the unseated check valve 114, chamber 113 and port 112.

Also formed in the stem of the spool valve 109 are a pair of annular grooves 117 and 118 separated by an O-ring 119. In the position of the handle 106 shown, the groove 117 communicates only with a passageway 120 and retains any fluid pressure therein. Passageway 120 communicates with a chamber 121 which in turn communicates with passageway 43 and the control chamber 42, in a manner to be more fully described hereinafter. In the elevated position of the valve 109, the groove 118 is aligned with the passageway 120 to vent the latter to atmosphere via a chamber having an exhaust opening 122 formed in the housing 107 adjacent the handle 106.

For controlling the charging and recharging of fluid under pressure in the control chamber 42, there is provided in the brake cylinder release portion a piston 123 including a stem 124. The stem 124 is subject at one end to the fluid under pressure in a chamber 125 communicating with the brake pipe passageway 34. The piston 123 attached to the other end of stem 124 is provided with an annular flexible diaphragm 127 connected between casing sections along its outer edges and between a follower assembly and piston 123 along its inner edges. The diaphragm 127 is subject on one side to the fluid under pressure in a chamber 126 communicating with the emergency reservoir 3 by way of passageway 11. On its other side the diaphragm 127 is subject to the fluid under pressure in a chamber 128 in constant communication with the control chamber 42 via a charging choke 129 and passageway 43, as well as to the force of a biasing spring 130 and, partially, to the force of a second biasing spring 131 disposed in a cage slidably mounted in the casing for movement inwardly limited by a snap ring 133 and movement outwardly limited by the top of the casing section.

Communication between the emergency reservoir 3 and the control chamber 42 is normally maintained by way of passageway 11, chamber 126, an annular groove 136 formed in the stem 124, restricted passageways 134 and 135 and passageway 43. In this connection it is to be noted that fluid under pressure from the emergency reservoir 3 is also provided in the chamber 128 via passageway 43 so that the combined force of the pressure of fluid in addition to the forces of the springs 130 and 131 is effective to maintain the piston 126 against a stop thereby to maintain the restricted passageways 134 and 135 in communication with the groove 136.

A motor piston device 139 is operative to prevent the release of the brakes when the pressure of the fluid in the brake pipe is above a predetermined amount as for example 10 p.s.i. The motor piston 139 includes a stem 140 sealingly slidable in the housing. Piston 139 is subject to a biasing spring 146 and to a diaphragm 142 of which the outer edges are fastened between housing sections. The diaphragm 142 is subject on one side to fluid under pressure in a chamber 143 constantly communicating with the brake pipe passageway 34 via branch passageway 144. On the other side the diaphragm 142 is subject to a biasing spring 146 located in a chamber 145 constantly vented to atmosphere via a port 147. When the pressure of the fluid in the chamber 143 is above the predetermined amount, the force of the pressure in the chamber 143 connected to the brake pipe 4 via branch passageway 144 and passageway 34 is effective to move the stem 140 to the right against the force of the biasing spring 146 so that an O-ring 148 cuts off communication between the chamber 121 and the passageway 120. Hence, in the event the brake pipe 4 is charged with fluid under pressure, when the handle 106 is moved and the spool valve 109 lifted so that the groove 118 venting the passageway 120 to atmosphere is aligned with the latter, the O-ring 148 is disposed to the right of the inlet of the passageway 120 and in this manner cuts off communication of the chamber 121 with the passageway 120 and thereby prevents venting of the control chamber 42 through passageway 137, chamber 128, choke 129, and passageway 43.

Assuming that the brake pipe 4 is devoid of fluid under pressure and it is desired to recondition the brake control device without recharging the brake pipe to the normal running pressure, the handle 106 is momentarily moved sufficiently to bring the end of the spool valve 109 into engagement with the valve 114 to align the groove 118 on the spool valve with passageway 120 and without unseating the check valve 114. Fluid under pressure in chamber 128 is vented to atmosphere via a passageway 137, chamber 121, passageway 120, groove 118 and handle opening 122. At the same time fluid under pressure from the emergency reservoir 3 in the chamber 126 causes the piston 123 to move to the right and depress both springs 130 and 131 so that the groove 136 is no longer aligned with the branch passageways 134 and 135 thereby to cut off communication between the control chamber 42 and emergency reservoir 3. The control chamber 42 is maintained vented to the atmosphere via passageway 43, throttled passageways 134 and 135, chamber 125 and the brake pipe passageway 34.

The handle 106 will return to the normal position as shown by the action of spring 110 acting on the spool valve 109 and on camming surface 108 when the handle force is released.

To reconnect the emergency reservoir 3 to the control chamber 42, the brake pipe pressure must be restored in passageway 34. Fluid pressure in the brake pipe passageway 34 is supplied to chamber 143 on the diaphragm 142 and to chamber 125 and via throttled passageways 134 and 135 to passageway 43 leading to control chamber 42 and via choke 129 to chamber 128. The atmospheric communication from chamber 128 by passageway 137, chamber 121 and passageway 120 is cut off by the groove 117 in the spool valve 109 thus allowing chambers 128 and 143 to charge with the brake pipe. When more than 10 p.s.i. is established in chamber 143, the spring 146 is overcome and piston 139 and stem 140 move against the spring 146, and the O-ring 148 in the end of the stem will cut off communication between passageways 137 and 120.

When approximately 30 p.s.i. is established in the brake pipe and in chamber 128, the fluid pressure together with springs 130 and 131 will move piston 123 and stem 124 against emergency reservoir pressure in chamber 126 until the spring cage of spring 131 engages the snap ring 133 to sever the communication between brake pipe pressure in chamber 125 and to open throttled passageway 135 to groove 136 to allow a slow charging of passageway 43 and chamber 42 and 128 from the emergency reservoir 3 via passageway 11.

When fluid pressure in chambers 42 and 128 are recharged to within 3 to 5 p.s.i. of emergency reservoir pressure in chamber 126, the spring 130 will move the piston 123 and stem 124 to the position shown wherein communication between passageways 43 and 11 is established by the throttled passageways 134 and 135 and the groove 136.

The manual release valve device 27 may be removed and replaced by a blanking plate 69 (FIG. 4) when the manual release control of the brake cylinder pressure is not required. This blanking plate terminates passageway 34 at the mounting face and permanently connects passageways 43 and 11 via a passageway 69a for continuous communication of the emergency reservoir fluid pressure into control chamber 42.

The direct release valve device 26 comprises a housing 149 secured to the service portion 7 and a cover 141 secured to said housing to form a bore containing a piston 150 having a guide portion 151 slidable within the cover 141. A long travel annular flexible diaphragm 152 is secured at its inner edge to the piston 150 and at its outer edge between the housing and cover sections. The diaphragm 152 is subject on one side to the pressure of fluid in a chamber 153 constantly communicating with the brake pipe via passageway 154, passageway 87, choke 88, passageway 34, air strainer 23, and passageway 9. On the other side the piston 150 is subject to a biasing spring 155 which is disposed in a chamber 156 constantly vented to atmosphere via opening 157. The biasing spring 155 is coaxially arranged in the guide portion 151 and engages the piston 150 at one end and at the other end engages a plate member 158 having a recess therein by which it is rockably mounted on a conical boss provided on the cover 141. Disposed in a hollow sleeve member 159 coaxially fixed in the piston member 150 is a valve stem member 160 having friction rings 161 operative to couple the valve stem member 160 to the piston 150 for movement therewith in a manner to be more fully explained hereinafter. Secured to the right end of the valve stem member 160 by way of a pin 162 is a hollow valve stem member extension 163 in the form of a sleeve having an open end and an outer flange 165. A chamber formed between the end of the valve stem member 160 and the sleeve member 159 is in continuous communication with chamber 153 by an axial passageway 166 in said valve stem member, for equalizing the pressures acting on said stem.

Disposed in the hollow stem extension 163 is a valve member 168 biased by a spring 170 into seated relation on an annular seat 169 on the housing 149 and having its outward movement limited by an inner flange 164 at the end of extension 163. On the other side the valve member 168 is subject to fluid under pressure in passageway 91 opening within the seat 169. For limiting the movement of the valve member 168 away from the valve seat 169, there is provided an annular disc 171 suitably secured to the housing so that the inner peripheral edges overlie the outwardly extending flange 165 of the hollow stem extension 163. In this manner upon a small movement of the piston 150, as when the force of fluid pressure in the chamber 153 is greater than that applied by biasing spring 155, the piston is moved to the left as viewed in FIG. 2 and the friction rings 161 are effective to simultaneously move the valve stem 160 in the same direction so that the inner flange 164 is operative to unseat the valve member 168 from the valve seat 169. The biasing spring 155 is selected so as to have a rapid pick-up thereby rendering the piston 150 promptly responsive to variations in the fluid under pressure in the chamber 153. A small increase in pressure in chamber 153, as above described, is operative to move the stem 160 until the outer flange 165 abuts the annular disc 171 so that upon further increase in the fluid under pressure in said chamber the friction connection established by the friction rings 161 is operative to permit relative movement between the sleeve member 159 fixed to the piston 150 and valve stem 160. In this manner upon a slight reduction of the fluid under pressure in chamber 153, the movement of the piston 150 in the righthand direction is operative through the frictional connection to concurrently move the valve stem 160 and thereby permit prompt seating of the valve member 168 on its seat 169.

Assuming an increase of the pressure of fluid in the brake pipe 4, as during release of the brakes, and thereby in the chamber 153, the piston 150 moves against the force of the spring 155 and unseats the valve 168 to establish communication between the chamber 42 via passageway 97a, chamber 97, passageway 96, valve 98, passageways 91a and 91 to chamber 153 and to the brake pipe via passageways 154 and 87, choke 88, passageway 34, strainer 23 and passageway 9.

A reduction in brake pipe pressure as when a brake application is made, and thereby the pressure in chamber 153 is reduced, results in the valve 168 being promptly seated to disestablish any possible communication between the brake pipe and chamber 42 until a predetermined brake pipe pressure increase has been made as when making a release of a brake application.

When a sufficient number of cars have been equipped with this new brake equipment during the transition period to control the train by the graduated brake release control without prohibitive slack action by reason of the number of direct release brakes in the train, the direct release portion 26 may be removed and replaced by the blanking plate 26a (FIG. 5) which terminates both passageways 154 and 91 at the mounting face.

Referring now to the emergency portion 8 (FIG. 3), the continual quick service valve device 16 serves to provide continual quick service at each reduction of the fluid under pressure in the brake pipe and includes a diaphragm type piston 172 subject on one side to a pilot pressure in a chamber 174 supplied thereto via a passageway 175, as more fully to be explained hereinafter. On the other side, the piston 172 is subject to the pressure of fluid in a chamber 176 which is in constant communication, via choke 178 and passageway 177 with a quick service volume 179 and is subject continually to the force of a biasing spring 180. The piston is fixed to one end of a stem 181 having a bore 182 in which there is slidably and sealably disposed a plunger 183 having an axial passageway 184 and is biased downwardly by way of a biasing spring 185 into contact with a snap ring 186 fixed to the lower end of the stem 181. The stem 181 is provided with an annular groove 187 and an axial and transversely extending passageway 188 in constant communication with one end of the bore 182. The groove 187 is adapted to be aligned with an atmospheric vent opening 190. A second groove 191 is formed about the hollow portion of the stem and is communicable with a reset volume 192 and a passageway 193 communicating with the quick service valve device 17 in a manner more fully to be explained hereinafter.

For controlling flow of fluid under pressure to and release of fluid under pressure from the quick service volume, there is provided a quick service check valve 194 located in a chamber 199 and normally biased onto a seat 195 by a spring 196 and operable by stem 181 of piston 172 to be unseated as will be hereinafter explained to establish communication between said chamber and a chamber 197 connected by a passageway 198 to the quick service volume 179. The chamber 199 is in constant communication with the brake pipe via choke 201, passageway 200, brake pipe strainer 23 and passageway 34.

Assuming a service application of the brakes, such that there is an increase in pressure in the pilot chamber 174, supplied from the brake pipe as more fully explained hereafter, the piston 172 moves downwardly thereby to correspondingly move the stem 181 such that the plunger 183 abuts the check valve 194. In this connection, it is to be noted that the check valve 194 is maintained seated by the force of spring 196 together with the air pressure loading of brake pipe pressure in chamber 199 and atmospheric pressure in chamber 197. It is also to be noted that the value of spring 185 acting on the plunger is less than the force seating the check valve 194 yet is greater than the force of spring 196 acting on the check valve.

Assuming a service application of the brakes, such that fluid pressure from the brake pipe is supplied to the pilot chamber 174, as will be more fully explained hereinafter, the piston 172 and piston stem 181 move downwardly such that the groove 191 communicates only with passageway 193 and the reset bulb 192 communicates with groove 187 and the atmosphere passageway 190.

The plunger 183 engages valve 194 to terminate communication from chamber 197 to the atmosphere via passageway 184, bore 182, passageway 188, groove 187 and passageway 190. The plunger rests against valve 194 and further downward movement of piston 172 and stem 181 results in compression of spring 185 and the plunger entering the bore 182 in stem 181 until the end of said stem 181 engages the valve 194 to unseat the valve against brake pipe pressure and the force of spring 196. Communication is then established via valve 194 between the brake pipe from passageway 9, strainer 23, passageway 200, choke 201, unseated valve 194 to chamber 197 then via passageway 198 to the quick service bulb 179 to charge the quick service bulb to the pressure of fluid in the brake pipe. At the same time, fluid under pressure is supplied from the quick service bulb 179 via passageway 177, choke 178 to chamber 176 under piston 172 until the pressure of fluid in chamber 176 and the force of spring 180 exceed the force of fluid under pressure in chamber 174 over the piston.

Equalization of fluid pressures in chambers 199 and 197 removes the fluid pressure differential across valve 194 and spring 185, acting through plunger 183 against said valve and spring 196, further raises the valve from its seat 195 so that as the piston 172 and stem 181 move in the direction of chamber 174, communication from chamber 192 to the atmosphere passageway 190 is cut off and then communication is established from passageway 193 via groove 191 to chamber 192.

Final upward movement of piston 172 and stem results first in valve 194 being seated on seat 195 by spring 196 and the plunger 183 leaving valve 194 to establish communication from chamber 197, 179 and 176 to the atmosphere via passageway 184, bore 182, passageway 188, groove 187 and passageway 190.

The quick service valve device 17 includes a hollow shaft 202 slidably mounted for up and down movement on a casing section 203 and having fixed to one end thereof a diaphragm type quick action piston and follower assembly 204. Piston 204 is subject on one side to the pressure of fluid in a chamber 206 in constant communication with the quick action chamber 14 via passageway 15. The other side of piston 204 is subject to the force of the fluid under pressure in a chamber 208 in constant communication with the brake pipe 4 via passageway 34, strainer 23 and passageway 9.

For controlling the passage of fluid to and from the pilot chamber 174 of the continual quick service valve device 16, there is provided a check valve 209 arranged in a chamber 210 of a stem insert 211 mounted in quick action piston 204. The chamber 210 is open to the chamber 208 via openings 212, a sub-chamber 213 and opening 214. The check valve 209 is subject on one side to the force of a biasing spring 215 which serves to bias the check valve 209 onto a seat 216 formed on the lower end of a hollow stem 217 integral with the stem insert 211 and slidably guided in the end of an axial bore 218 formed in the casing section 203. The plunger 219 is slidably mounted within the casing section 203 and has a reduced section portion 207 extending into the hollow stem 217 with a clearance to form an annular passageway 220 between the reduced section 207 and the hollow stem 217. Section 207 and the plunger 219 are provided with an axial passageway 221 communicating with an annular groove 222 which communicates with a vent opening 223. The plunger 219 is formed with a flange 224 adjacent its upper end for engaging shoulder 239 in the bore 218 for limiting the travel of the plunger toward the valve 216. A second groove 225 is also provided at the upper end of plunger 219 to communicate with the vent opening 223 via choke 226 and is open to a communication space 227 in an enlarged portion 228 of the bore 218.

Slidably mounted in the enlarged bore portion 228 is a hollow valve stem member 229 having fixed to its upper end a valve 230 located in a chamber 231 in constant communication with the quick action chamber 14 via passageway 15. Valve 230 is seatable on a valve seat 232 formed about the end of the enlarged bore portion 228. A groove 242 is provided in the hollow valve stem 229 communicating at all times between the area enclosed by valve seat member 232 under valve 230 and a passageway 243 leading to the vent valve device 18. The valve 230 is retained on the stem 229 by a nut 173 having an upwardly extending annular flange 235 serving as a guide for a valve 236. Valve 236 is biased to a seat 238 about the bore in the hollow stem 229 by a spring 237.

A second plunger 233 is slidably mounted in the hollow valve stem member 229 and has its lower end extendable below the lower end of said stem member and contacting the upper end of the plunger 219. In the second plunger 233 is formed a longitudinally extending peripheral groove 234 opening at its lower end into the communication space 227 and at its upper end into the area enclosed by the valve seat 238 below valve 236.

In the brake release position, as shown, wherein the forces on either side of the quick action motor piston 204 are substantially equal, the biasing spring 237 is operative to maintain the check valves 230 and 236 seated on their respective seats 232 and 238 and also force the second plunger 233 downwardly and thereby seat the flange 224 on the shoulder 239 so that the plunger 219 is in its fully extended position. As shown, the pilot chamber charging check valve 209 is seated on the seat 216 of the hollow stem 217 but spaced from the lower end of the plunger 219. In this manner the pilot chamber 174 is vented to atmosphere via passageway 175, annular passageway 220, bore 221, annular groove 222 and vent opening 223.

In the service operation of the quick service and emergency pilot valve device 17, at which time there is a reduction in pressure in chamber 208 so that the piston 204, valve 209, insert 211 and stem 217 are moved upwardly, valve 209 first engages the end of the plunger 219 to cut off the atmospheric communication via passageway 221. The plunger 219 then supports the valve 209 and the valve seat 216 moves away from said valve to establish communication from the brake pipe passageway 9 via strainer 23, passageway 34, chamber 208, openings 214, chamber 213, annular passageway 220 and passageway 175 to charge chamber 174 to the pressure of fluid in the brake pipe. The reduction of fluid pressure thus brought about in chamber 208 urges piston assembly 204 further upward in which the upper end of hollow stem 217 engages the plunger 219 to elevate said plunger and the second plunger 233 to unseat valve 236. In this manner fluid under pressure from the quick action chamber 14 and from chamber 206 below the piston assembly 204 is vented at a controlled rate to the atmosphere, via passage 15, chamber 231, passageway 234 in stem 233, groove 225, choke 226 and passageway 223, tending to return the piston assembly 204 to its normal position shown.

In the event that the reduction of the fluid under pressure in the brake pipe is such that the choke 226 is not adequate to permit the quick action chamber 14 to vent to atmosphere at a sufficiently rapid rate, a differential is established between the pressures in the chamber 206 and the chamber 208, respectively, associated with the brake pipe pressure and the quick action chamber pressure so as to cause the piston assembly 204 to move upwardly whereby the hollow stem 217 engages the plunger 219 and the latter abuts the hollow valve stem 229 to elevate the emergency check valve 230 from its seat 232 thereby to provide communication between the chamber 231 and the vent valve device 18 via annular groove 242 formed on the valve stem 229 and a passageway 243. During this movement upwardly, the choke 226 is cut off from communication with the groove 225 so that fluid under pressure in the quick action chamber 14 is only vented by way of the vent valve device 18, as more fully to be explained hereinafter.

To equalize the pressure in the brake pipe 4 and the emergency reservoir 3 after an emergency or service brake application and when brake pipe pressure is established at a fixed rate, there is provided a valve stem 244 sealingly and slidably disposed in the casing and having its upper end extending into the chamber 206. Fixed adjacent to the upper end of the stem 244 is an inverted cage 245 which retains between a flange 246 and the casing, a spring 247 operative to urge the stem 244 upwardly. Formed in the stem 244 is an axial bore 248 which communicates at its lower end with an annular groove 249 communicable with the passageway 193 associated at its other end with the reset bulb or volume 192 via groove 191 formed in the continual quick service plunger 181. The lower end of the stem 244 is provided with a flange 251 which abuts up against a shoulder 252 so as to limit upward movement of the stem 244 into the chamber 206 and is also formed with a downwardly projecting portion 253 extending into a back-dump chamber 254 which is in constant communication with a back-flow inlet chamber 255 via passageway 256.

When the fluid pressure in the brake pipe 4 is established above the fluid pressure in the chamber 206, the quick action piston 204 moves downwardly thereby to depress the stem 244 against the force of the fluid under pressure in the chamber 206 and the spring 247 and at the same time restrict the flow of fluid through the axial bore 248 communicating with the reset bulb 192, as heretofore described. This restricted flow causes the movement of the quick action piston 204 to be cushioned such that the plunger 253 does not unseat the check valve 257.

In the event that the differential between the brake pipe pressure and quick action pressure is above a predetermined amount as when making a fast recharge of the brake pipe, the piston assembly 204 engages stem 244 and moves it against the spring 247, the lower end 253 of the stem 244 unseats the back-dump check valve device 21 which includes back-dump check valve 257 disposed in chamber 258 and normally biased upwardly into seating engagement with a seat 259 by a spring 260 and the pressure of fluid in the emergency reservoir 3 supplied thereto via passageway 11 and the spill-over check valve device 20. Upon unseating of the back-dump check valve 257, fluid under pressure from the emergency reservoir 3 is charged into the inlet chamber 255 of the back-flow check valve device 22.

The back-flow check valve device 22, which serves to control the one-way passage of fluid between the inlet chamber 255 and passageway 200 in constant communication with the brake pipe 4, strainer 23 and passageway 9, comprises a check valve 261 normally biased into seating engagement with an annular seat 263 by a spring 264. Hence, when the fluid under pressure in the emergency reservoir 3 is greater than the brake pipe pressure so as to overcome the force of the biasing spring 264, the back-flow check valve device 261 is unseated to provide communication in one direction only between the inlet chamber 255 and the passage 262.

For permitting fluid under pressure in the quick action chamber 14 and in chamber 206 to spill over into the emergency resrevoir 3 so as to prevent overcharge of the chambers when making a quick release of the brakes, there is provided a spill-over check valve device 20 which controls the one-way fluid flow between said chambers and a chamber 265 and the emergency reservoir passage 11. The chamber 265 is in constant communication with the quick action chamber 206 via a choke 266. The spill-over check valve device 20 includes a spill-over check valve 267 which is normally held in seated engagement on a seat 268 by a biasing spring 269.

When the pressure of fluid in the chamber 265 which corresponds to the pressure in the chamber 206 exceeds that in the emergency reservoir by a predetermined amount, the pressure of the fluid in the chamber 206 supplied thereto via charging choke 266 is operative to unseat the spill-over check valve 267 and thereby to provide communication between the emergency reservoir and the back-dump check valve, as above described.

The vent valve device 18 includes a diaphragm type piston member 270 from which there extends a stem 271 slidably disposed in the casing. Limiting the upward movement of the piston member 270 are spacing members 273 so as to provide a chamber 274 which is in constant communication with the passageway 243 associated with the quick service valve device, as hereinbefore described. The other side of the piston 270 is subject to atmospheric pressure in a chamber 275 connected to atmosphere via a passageway 276 connecting with an exhaust port 277. The exhaust port 277 is protected against entry of mud, dirt and insects into the brake pipe exhaust passage 276 by a protected vent fitting in the usual manner.

The lower end of the stem 271 extends into a chamber 278 and is adapted to contact vent valve check valve device 279 which controls communication from the brake pipe passageway 9 to atmosphere via the chamber 278, passageway 276 and exhaust port 277.

The vent valve device 18 includes a valve guide member 280 slidably disposed in the chamber 278 constantly communicable with the brake pipe passageway 9 and includes a valve member 281 formed on its upper surface. The valve member 281 is normally biased into engagement with a valve seat 282 by a spring 283 so as to provide for one-way passage of fluid from the passageway 9 to the exhaust port 277. The valve guide member 280 is further provided internally with a coaxial hollow boss 284 having an axial passageway 286 so as to vent the hollow boss to atmosphere via the exhaust port of the vent valve. On the lower end of the hollow boss 284 there is sealingly and slidably disposed a cylindrical cap 287 which is normally maintained in the position shown by the fluid pressure in the chamber 285 against the force of a biasing spring 288 located in the hollow of the boss 284.

When the brake pipe passageway 9 is vented to atmosphere as when the valve 281 is unseated, the fluid pressure is reduced so that the biasing spring 288 is operative to displace the cylindrical member 287 downwardly into engagement with the high pressure valve device 19.

The high pressure valve device 19 serves to control the passage of fluid between a chamber 289 in constant communication with the emergency reservoir 3 via passageway 11 and an outlet chamber 290 in constant communication with the auxiliary reservoir 2 via passageways 62 and 12. Separating the chambers 289 and 290 is a check valve 291 which is biased into seating engagement with a seat 292 via biasing spring 293 located in the chamber 289. Valve 291 is engageable with the lower end of a stem 294 which is normally biased to an upper limit position by a spring 295. When the brake pipe pressure is reduced to the atmosphere, the cap 287 engages the upper end of the stem 294 so as to depress the latter, the high pressure check valve 291 is unseated thereby to provide communication between the emergency reservoir passageway 11 and the auxiliary reservoir 3 via passageways 62 and 12.

*Initial Charging of the Apparatus*

Assume initially that all of the passages and chambers of the brake apparatus shown in the drawings are at atmospheric pressure and that the various parts of the apparatus are in their respective positions in which they are shown in the drawings and that it is desired to initially charge such apparatus, by way of the engineer's brake valve (not shown) on the locomotive, fluid under pressure will then be supplied to the brake pipe 4 and such fluid under pressure will flow therefrom into the respective passages 9 in each brake control apparatus on the cars of the train. In the respective brake apparatus on any particular car of the train fluid under pressure will flow from the passage 9 to the auxiliary reservoir by way of the strainer 23, passageway 34, and inlet chamber 32, the unseated check valve 28 and the outlet chamber 33, the passageway 35, the charging choke 36 and the passageway 12.

At the same time fluid under pressure from the brake pipe passageway 34 is supplied by way of choke 88, passageway 87, groove 85 and passageways 89 and 90 to passageway 91a, past the unseated valve 98, passageway 96, chamber 97, passageway 97a to the control chamber 42, then by way of passageway 43 and passageways 134 and 135 in the manual brake cylinder release valve device 27, groove 136 to chamber 126 and passageway 11 to the emergency reservoir 3 to charge said emergency reservoir and said control chamber 42 to brake pipe pressure.

At the same time fluid under pressure from the brake pipe passageway 34 is also supplied by way of choke 88 and passageway 154 to chamber 153. The piston 150 will then move against the spring 155 carrying with it the valve stem 160 and valve 168 until the external flange 165 on the valve stem engages the annular disk 171. The valve stem 160 is thus restrained from further movement with the piston 150 which is thus positioned against the spring 155 according to brake pipe pressure and the valve 168 is maintained in close proximity to the seat 169.

At the same time, fluid under pressure is supplied to the chamber 128 of the manual release device 27 via passageway 43 and choke 129 corresponding to the control pressure in control chamber 42.

Concurrently and with charging of the auxiliary and emergency reservoirs, fluid under pressure from the passage 34 flows directly to the chamber 208 of the quick service and pilot valve device in the emergency portion 8. At the same time, fluid under pressure will flow from the brake pipe passageway 9 through the strainer 23, passageway 200, and choke 189 to charge the chamber 206 of the service valve and emergency pilot valve device 17 to brake pipe pressure, and also to charge the quick action chamber via passageway 15. Usually under normal operating conditions the fluid under pressure in the brake pipe chamber 208 is established at a more rapid rate than in chamber 206 and the quick action chamber 14 by reason of the charging choke 189. Piston 204 then moves toward chamber 206 and engages valve stem 244. If the rate of recharge is sufficiently greater as determined by spring 247 acting through the cage 246 against stem 244, the spring will yield and valve stem 244 will move with the piston assembly 204 to unseat the back-dump check valve 257. However, because during the initial charging the fluid pressure in the brake pipe is greater than the fluid pressure in the emergency reservoir, nothing occurs and the back-flow check valve 261 remains seated so as to prevent the flow of fluid under pressure in the passageway 262 to the emergency reservoir 3 by way of the back-dump check valve 257.

In the event that the chamber 206 charges more rapidly than desired so that the fluid under pressure therein exceeds the fluid under pressure in the emergency reservoir 3, the spill-over check valve 267 is unseated so that the fluid under pressure in the chamber 206 spills over to the emergency reservoir 3 via choke 266, chamber 265 and passageway 11.

Fliud under pressure in the chamber 206 passes via bore 248, groove 249, passageway 193 and groove 191 to the reset bulb 192 of the continual quick service device 16 to charge this bulb to quick action chamber pressure. It is also to be noted that fluid under pressure is supplied to the chamber 231 via passageway 15.

Service Application of the Brakes

In effecting a service application of the brakes, initiation of such application is effected by manipulation of the engineer's brake valve on the locomotive to reduce the normal pressure of fluid established in the brake pipe 4. In the respective brake apparatus of each car of the train, such reduction in brake pipe pressure is reflected in the brake pipe pressure chamber 208 of the quick service valve device 17 by way of the brake pipe passage 34. This service rate of reduction of fluid pressure in chamber 208 occurs faster than the pressure of fluid in quick action chamber 206 can equalize with the brake pipe via passageway 15, choke 189, passageway 200, strainer 23 and passageway 9. Such reduction in pressure in the brake pipe pressure chamber 208 of the quick service valve device 17 relative to the lesser reduction of pressure in the quick action chamber 206 of the quick action valve device 17 causes the quick action pressure to exceed the brake pipe pressure to the degree necessary to actuate the piston 204 upwardly whereupon the upward movement causes plunger 219 first to seat on valve 209 to close the atmospheric communication 221 then to unseat said valve from its seat 216 on member 218 to permit brake pipe pressure in chamber 208 to flow by way of openings 214 and 212 past valve 209, the annular passage 220, passageway 175 to the pilot chamber 174 on the upper face of the piston assembly 172 of the continual quick service valve device 16.

The charging of the chamber 174 of the continual quick service valve device 16 causes the piston assembly 172 to move downwardly such that the reset bulb 192 is first cut off from communication with the groove 191 and thereby the passageway 193. At the same time the reset bulb 192 is aligned with the annular groove 187 so as to be vented to atmosphere via opening 190.

The supply of fluid under pressure from the brake pipe in chamber 208 to chamber 174 causes a local quick reduction of fluid pressure in chamber 208 so that the piston 204 moves to a position in which the plunger 219 acts through the plunger 233 to unseat the valve 236 and connect fluid under pressure in the quick action chamber 14 via passageway 15 past the open valve 236 to the atmosphere via chamber 231, groove 234, space 227, groove 225, choke 226 which serves to control the rate at which quick action chamber pressure is reduced, and opening 223.

At the same time that the continual quick service piston 172 is moved downwardly under the influence of the pressure of fluid from the brake pipe in the pilot chamber 174 and the plunger 183 engages the check valve 194 to cut off communication of the quick service bulb 179 with atmosphere via the passageway 198, bore opening 184, passage 188, and groove 187 communicating with the vent opening 190. The spring 185 acting on the plunger 183, being incapable of unseating valve 194, is depressed, until the end of the piston stem 181 engages the check valve 194 to unseat the latter from its seat 195 and establish communication from the brake pipe passageway 200 via choke 201 and passageway 198 to the quick service bulb 179 and via passageway 177 and choke 178 to chamber 176 below piston 172. Hence, a full complement of brake pipe pressure will be established in the quick service volume 179 before sufficient fluid pressure is established in chamber 176 that, together with spring 180, the piston 172 is moved upwardly against the brake pipe pressure in the pilot chamber 174. When the forces on the opposing sides of the valve 194 are substantially equal, the plunger 183 is moved by spring 185 to further unseat said valve.

As the piston 172 is moved upwardly, communication is cut off between the reset bulb 192 and the atmospheric passageway 190 by groove 187 and communication is established between said bulb and the quick action chamber 206 by way of the groove 191, passageway 193, groove 249 and passageway 248 so that fluid under pressure from the chamber 206 flows to the reset bulb. This effects a rapid measured reduction in quick action chamber pressure below the piston 204 to cause it to move toward the release position in which the valve 209 seats on its outer seat 216 whereupon the plunger 219 moves upwardly so as to permit fluid under pressure in the pilot chamber 174 of the continual quick service valve device 16 to flow to exhaust through the central bore 221, annular groove 222 and vent opening 223. In this manner the continual quick service piston 172 moves upwardly to its release position in which valve 194 returns to its seat on seat 195 and the plunger 181 is displaced away from the check valve 194 to thereby vent the quick service bulb 179 to atmosphere via the passage 198, passageways 184 and 188, annular groove 187 and opening 190.

During the release movement of the quick service piston 204, as it returns to the normal position shown, the lower end of the piston approaches the top of the plunger 244 so as to restrict the flow of the fluid under pressure in chamber 206 through the bore 248, groove 249, passageway 193 communicating with the reset bulb 192 by way of annular groove 191 in the stem of the continuous quick service valve device 16. In this manner a reduction in the fluid under pressure in the quick action chamber 206 does not cause the plunger end 253 to engage the back-dump check valve 257 and an undesired release of the brake application is avoided.

The above-described cycle of operation of the quick service and emergency valve device cooperating with a continual quick service valve device results in a fixed reduction of brake pipe pressure at the emergency portion of each and every control valve device in the train. In this manner the amount of fluid under pressure that must be released from the brake pipe to the atmosphere with a service reduction through the brake valve devise on the locomotive is reduced.

If the brake pipe reduction at the locomotive brake valve ceases with the first impulse of the quick service valve device, only one operation of the (described above) quick service and emergency valve device cooperating with the continual quick service valve device will occur. However, if this reduction is again made or is continuous the valve devices are again operative to operate in the manner described above so long as the reduction at the locomotive brake valve continues. In this manner the engineer or operator in the locomotive has control of the brake application and the quick service activity through the train by the control of his brake valve at each and every reduction.

The reduction of brake pipe pressure in each of the cars of the train or control valve devices of the train is instantaneously reflected in the brake pipe pressure chambers 44 of the service valve device 25 such that the motor piston 37 will move against the force of the spring 45 due to the higher pressure of fluid in the control chamber 42 so that flow of fluid under pressure via the charging passageways 91a, passageways 89 and 90, groove 85, passageway 87 and choke 88 to brake pipe passageway 34 is cut off by seating of the emergency reservoir charging check valve 98. In this manner emergency reservoir pressure is retained as a fixed control pressure in control pressure chamber 42. When the reduction of the fluid under pressure in the brake pipe is sufficiently reduced, for example, by four lbs. p.s.i., the upward movement of the piston 37 is operative through the slidable pin 47 to move the follower assembly 38 and thereby the stem 39 upwardly against the force of the springs 55a so that the brake cylinder passageway 10 is no longer vented to atmosphere via the annular groove 54 and the exhaust passageway 13. Further upward movement of the stem 39 causes the unseating of the brake cylinder charging check valve 55 so as to provide communication between the brake cylinder device 1 and the auxiliary reservoir 2 via passageway 12, choke 83 and passageway 68 also by parallel passageway including choke 299, passageway 62, chamber 77 and passageway 68, unseated check valve 55, chamber 63 and passageway 10.

It is noted that at the time the upper end 61 of stem 39 engages valve 55, the movement of piston 37 will then allow valve 102 and stem 103 to move upwardly to allow valve 102 to seat on its seat 105 cutting off communication between chamber 42 and passageway 92.

The rate of flow of the fluid under pressure from the auxiliary reservoir 2 to the brake cylinder 1 is initially controlled by the supply of fluid under pressure through the service choke 83 and at the same time through the inshot choke 299 past the open inshot check valve 78, as above described. However, when the pressure in the brake cylinder passageway 10, active by way of choke 65 in the chamber 64 of the inshot valve device 24, overcomes the force of the first spring 70, the piston assembly 66 of the inshot valve device 24 contacts the spring cage 72 and the force of the caged spring 71 supports piston 66 in a position in which the check valve 78 is not seated on its valve seat 82 to cut off further communication through the choke 299 and passageways 62 and 68 to the brake cylinder device 1.

When the pressure in the chamber 64 has been sufficiently increased, as for example to 10 or 11 lbs. p.s.i., the caged spring 71 is compressed, such that the cage 72 moves into engagement with the top of the inshot valve casing portion allowing the inshot check valve 78 to seat cutting off communication of the passageways from the auxiliary reservoir by way of the inshot choke 299 to the brake cylinder 1 and limiting further build-up of brake cylinder pressure to the capacity of service choke 83.

At the same time that the fluid under pressure in the brake pipe passageway 34 is reduced, as above described, there is a corresponding reduction of fluid pressure in the chamber 153 of the direct release valve device 26 which is in communication with the brake pipe passageway 34 via choke 88 and passageways 87 and 154. Such a reduction in brake pipe pressure in the chamber 153 permits the spring 155 to yieldably move the piston 150 whereby the friction rings 161 coupling the valve member 160 to the piston causes the valve 168 to seat on the seat 169 and cut off communication between the brake pipe passage 34 and the direct release passageway 91, until the brake pipe pressure has been definitely increased for releasing the brakes. After the check valve 168 is seated or if the piston 150 continues to slide forward relative to the valve portion 160 against the force of the friction rings 161 to a position in which the force of the decreased pressure in chamber 153 is balanced by the decreased force of the extended spring 155, in this position friction rings 161 are operative instantaneously for movement with the motor piston 150 upon an increase in brake pipe pressure required for a release of the brakes in the chamber 153 for opening communication to the passageway 91.

During the period in which fluid under pressure from the auxiliary reservoir 2 is established in the brake cylinder passageway 10, the chamber 52 above the motor piston 38 is also charged with fluid under pressure via choke 53 so as to offset, by way of the pin 47 abutting the equalizer piston 37, the differential pressures acting on the latter, as heretofore explained. When the increase in pressure in the chamber 52 is approximately 2½ times the amount of the reduction in brake pipe pressure, such an offsetting causes the end 61 to move downwardly into a lap position.

The service valve 55 then seats thereby to cut off supply of fluid pressure to the brake cylinder device via chamber 63 and passageway 10. However, in the event that there is leakage in the brake cylinder, this will be reflected as a reduction in the pressure of the fluid in the chamber 52 so that the unequalized pressures in the chambers 42 and 44 acting on the equalizer piston 37 is effective to move the stem 39 upwardly whereby the check valve 55 is again unseated to open communication from the auxiliary reservoir to the brake cylinder 1 thereby to increase the pressure in the latter until the forces on the piston 38 and the fluid under pressure in the chamber 44 equalize with the fluid under pressure in the control chamber so that the service valve returns to its lap position.

*Quick Release of Brakes Following a Service Application*

To effect a quick release of the brakes following a service application of the brakes, as distinguished from a direct or graduated release of the brakes, fluid under pressure is supplied to the brake pipe 4 upon manipulation of the engineer's brake valve on the locomotive back to release position from the existing service application position. Fluid under pressure is thus supplied to the brake pipe passage 34 at the maximum capacity of the brake valve whereby the increase in brake pipe pressure is effective in the emergency portion 8 of the control valve device to recharge the quick action chamber 14 via the brake pipe passage 9, pipe strainer 23, choke 189, and passageway 15 and as described heretofore under the initial charging operation. The rate of brake pipe pressure increase is of such magnitude as to increase the pressure in the chamber 208 of the quick service and emergency pilot valve device 17 faster than the quick action chamber 14 and control chamber 206 can recharge from the brake pipe as described above via the choke 189 to cause the piston 204 to compress the caged spring 247, to displace the plunger 244 and plunger end 253 so as to unseat the back-dump check valve 257 and thereby to supply fluid under pressure from the emergency reservoir 3 past the unseated back-flow check valve 261 to the brake pipe passage for a quick recharge of brake pipe pressure via passageway 260 connected to the brake pipe 4 via strainer 23, and passageway 9. This back-dumping operation continues until the emergency reservoir has equalized into the brake pipe to provide a complete release of the brakes.

The increase of fluid pressure in the brake pipe 4 is equally effective in the chamber 153 of the direct release valve device 26 via passageway 9, air strainer 23, passageway 34, choke 88 and passageways 87 and 154. This increase in pressure causes the check valve 168 to unseat substantially instantaneously, as above explained, so that communication is provided between the chamber 153 and passageway 91.

At the same time, the pressure is increased in the brake pipe chamber 44 of the service valve device 25 via passageway 34 and the pressure in control chamber 42 is being reduced with the emergency reservoir pressure so that the equalizer piston 37 is moved downwardly to open the check valve 98 in the chamber 95. When the check valve device is opened, the fluid under pressure in the control chamber 42 communicates via passageway 97a, chamber 97, passageway 96, chamber 95, passageways 91a and 91, chamber 153, passageways 154 and 87, choke 88 and passageways 34 so as to provide for equalization of the brake pipe and control pressures in the chambers 44 and 42, respectively. This causes the service valve to move downward so that the brake cylinder passageway 10 is aligned with the groove 54 thereby to establish communication with the exhaust passageway 13 to vent the brake cylinder pressure to atmosphere.

Direct Release Following a Service Application of the Brakes

To effect a direct release of the brakes following a service application as distinguished from a graduated release of the brakes, a slow rate recharge of the brake pipe pressure, as determined by the manipulation of the engineer's control valve results in a similar charging of the quick action chamber 14, as above described, without causing the stem end 253 of the quick service and emergency pilot valve device 17 to displace the back-dump valve 257 so that no flow is established between the emergency reservoir and the brake pipe, as described above, for effecting a quick release of the brakes.

With the service valve device 25 in its lap position, the supply of fluid under pressure in the brake pipe passageway 34 causes the corresponding increase in the fluid under pressure in the brake pipe chamber 44 of the service valve device to restore the service valve device toward its release position. The check valve 102 being unseated from its seat 103 in lap and release position of the service valve maintains communication from chamber 42 to the passageway 92. However, no flow occurs through the passageway 92 until the direct release check valve 168 is unseated. Such unseating is accomplished by an increase in pressure via the chamber 153, as previously described. As before described, the inshot chamber 64 is charged with brake cylinder pressure such that the passageways 89 and 90 are aligned with the groove 84 and passageway 92. When the direct release valve 168 is unseated, the fluid under pressure from the control chamber 42 flows by way of open check valve 102 to the passageway 92 and then by way of the annular groove 84, passageways 89, 90 and 91, chamber 153, passageways 154 and 87 and choke 88 to the brake pipe passageway 34 and to chamber 44. The above-described fluid flow occurs when brake pipe pressure has been increased a predetermined amount, such as approximately 2 lbs., so as to permit a complete equalization of pressures of across the equalizer piston 37 whereby brake cylinder device 1 is vented to atmosphere via passageway 10, groove 54, and exhaust passageway 13, and thus to complete a prompt release of the brakes.

Graduated Brake Release Following a Service Brake Application

To effect graduated control of the brakes following a brake application wherein the brake cylinder pressure is released to the exhaust in increments determined by the degree of movement of the engineer's brake valve handle from the service position toward release position, it is necessary to remove the direct release valve device 26 and replace same with a blanking pad which terminates both passageways 91 and 154 at the release valve device mounting faces.

The increment of movement of the engineer's brake valve handle toward release position determines the degree of rise in the brake pipe pressure and the corresponding degree of release of fluid pressure in the brake cylinder. This rise is made at a rate which allows the quick action chamber 14 and control chamber 206 in the emergency portion 8 to charge without producing the differential required to effect back-dump operation. The release increments may be made until the pressure of fluid in the brake cylinder 1 and also in chamber 64 of the inshot portion has been reduced to approximately 6 p.s.i. Springs 70 and 71 are then effective to move the inshot piston 66 and stem 67 toward normal position until the spring cage 72 engages the snap ring 75. At this time, the O-ring 86 is located between passageways 89 and 90 to allow communication of fluid pressure from control chamber 42 to the brake pipe and chamber 44 via passageway 97a, chamber 97, unseated valve 102, passageway 92, groove 84, passageways 89 and 90, groove 85, passageway 87 and choke 88 to passageway 34 connecting to the brake pipe and to control chamber 44 to effect a complete and final release of the brakes without the delay accompanying the complete and final recharge of the brake pipe from the engineer's brake valve.

At the same time, the increment of rise in the brake pipe fluid pressure is registered in the control chamber 44 above the control piston 37. The service valve assembly of pistons 37 and 35 having been in a balanced condition by the respective pressure forces are thus unbalanced and said piston assembly and stem 39 moves against chamber 42 whereby groove 54 registers with passageways 10 and 13 to connect fluid pressure from the brake cylinder 1 and from chamber 52 above piston 38 to atmosphere until the pressure of fluid acting in chamber 52 on piston 35 again balances the differential between brake pipe pressure in control chamber 44 and emergency reservoir control pressure in chamber 42.

The graduated release operation can be performed again and again.

Emergency Application of the Brakes

To effect an emergency application of the brakes, the pressure of fluid in the brake pipe 4 will be reduced in well-known manner at an emergency rate by the manipulation of the usual engineer's brake valve device on the locomotive. In the manner previously described in connection with a service application of the brakes, the initial reduction of brake pipe pressure will effect operation of the quick service and emergency valve device 17 in the brake apparatus on each car throughout the train which, in turn, will cause operation of the respective service valve devices 25 to effect an inshot supply of fluid under pressure to the respective brake cylinder devices 1 and subsequently closure of the respective charging valves 55 when the pressure increases to a value above such as 10 lbs. p.s.i. so as to also close the valve 78 of the inshot valve device 24. The initial rate of reduction of the brake pipe pressure is effective at the quick service and emergency pilot valve 17 causing the piston 204 to move to its quick service position and initiate a quick service action, as described above. However, the rate of reduction of brake pipe pressure will be faster than the quick action chamber 14 can reduce to atmosphere via the unseated valve 236 and groove 234, groove 225, blow-down choke 226 and vent opening 223 so as to create a differential across the piston 204 causing the stem to unseat the emergency check valve 230 and to connect fluid pressure from the quick action chamber 14 via passageway 15, chamber 231, and unseated emergency check valve 230 to passageway 243 which is vented to atmosphere via choke 262, passageway 276 and exhaust port 277. At the same time, the pressure of fluid from the quick action chamber 14 active in the chamber 274 of the emergency piston 270 of the vent valve device 18 is effective due to the restriction of choke 262 to move the piston 270 and stem 271 downwardly into contact with the vent check valve 281 causing it to be unseated to connect the fluid under pressure in the brake pipe 4 by way of passageway 9 to the atmosphere via passage 276 and exhaust port 277.

The venting of passageway 9 as the result of unseating valve 281 also results in the pressure of fluid in chamber 285 below the valve guide 280 being reduced to the atmosphere by way of the flow groove provided in the outside diameter of the valve guide 280. Spring 288 acting inside the cylindrical cap 287 will then extend said cap to engage the stem 294 and to depress said stem to unseat the high pressure valve 291. Fluid pressure flow communication is thereby established between the emergency reservoir 3 and the auxiliary reservoir 2 by way of passageway 11, chambers 289 and 290 and passageways 62 and 12. Both reservoir volumes thus equalize into the brake cylinder through the service portion which operates as during the service operation to provide a higher brake cylinder pressure and a greater capacity for maintenance of the brake cylinder fluid pressure against leakage.

The vent valve piston 270 and the vent valve 281 are maintained in the lower position until pressure of fluid in the quick action chamber 14 equalizes to the atmosphere by way of the passageway 15, unseated valve 173, groove 242, passageway 243, choke 262 and passageway 276 and the exhaust port 277. When the pressure in the quick action chamber has been depleted below a certain value which requires approximately one minute of time, the valve 281 will again be seated by the spring 283 to permit recharge of the brake pipe. With the valve guide 280 returning the valve 281 to its seat, the spring 288 acting against the cap 287 remains effective to maintain the valve stem 294 depressed against the spring 295 thus holding the high pressure valve 291 from its seat and maintaining communication between the emergency and auxiliary reservoir pressures.

*Brake Release Following Emergency Brake Application*

Upon initiating a recharge of the brake pipe pressure following an emergency application, the quick action chamber 14 and control chamber 206 are at atmospheric pressure and the quick service piston 204 responsive to the initial charge of brake pipe pressure in chamber 208 will engage the stem 244 to compress spring 247 and unseat the back-dump valve 257. Communication is thus established from the emergency reservoir by way of the back-dump check valve 261 to charge the brake pipe from the emergency reservoir. By reason of the unseated high pressure valve 291, the auxiliary reservoir fluid pressure thus communicates with the emergency reservoir pressure and thus the auxiliary and emergency reservoir pressures cooperate for recharging the brake pipe until the pressure of fluid established in the brake pipe and in passageway 9 is effective in chamber 285 to overcome the spring 288 and return the cap 287 to its place at which time spring 293 becomes effective to seat the high pressure valve 291 and cut off communication between the auxiliary and emergency reservoirs.

Having now described the invention, what we claim as new and desire to secure by Letters Patent, is:

1. A railway car fluid pressure brake apparatus of the type comprising a normally charged brake pipe, quick service valve means including a movable abutment subject opposingly to brake pipe pressure acting in a brake pipe chamber at one side thereof and to the pressure in a quick action chamber on the opposite side thereof chargeable through a restricted communication from said brake pipe, a quick service volume, continual quick service valve means including a movable abutment subject opposingly to an operating fluid pressure in an operating chamber on one side thereof and to a biasing force and the pressure established in a balancing chamber on the opposite side thereof, means providing communication between said quick service volume and said balancing chamber to cause pressurization and venting of pressure in said balancing chamber in correspondence with that in the quick service volume, said quick service valve means being operative responsively to the reduction of brake pipe pressure in the brake pipe chamber relative to the pressure in the quick action chamber from a normal position to an operated position in which it supplies an operating pressure from the brake pipe chamber thereof to the operating chamber of said continual quick service valve means, thereby to cause operation of said continual quick service valve means from its normal position to an operated position in which there is established communication via which fluid under pressure is vented from the brake pipe to said quick service volume, a reset volume, said continual quick service valve means also being effective in its operated position to establish communication through which said reset volume is vented to atmosphere, said continual quick service valve means being restored to its normal position responsively to build-up of pressure in the balancing chamber thereof in correspondence with the build-up of pressure in the said quick service volume substantially to the pressure existing in the operating chamber of said continual quick service valve means, said continual quick service valve means being effective in its normal position to establish communication through which the quick service volume is vented to atmosphere and also to establish communication between said quick action chamber and said reset volume to cause a reduction of pressure in the quick action chamber, thereby to cause operation of said quick service valve means to its normal position in which it establishes communication through which the operating pressure in the operating chamber of the continual quick service valve means is vented to atmosphere, thereby to condition said continual quick service valve means for subsequent operation upon a subsequent operation of the quick service valve means from its normal to its operated position responsively to a further reduction of brake pipe pressure.

2. A railway car fluid pressure brake apparatus as claimed in claim 1, further characterized by choke means interposed in the communication between the balancing chamber of said continual quick service valve means and said quick service volume, thereby to delay the build-up of pressure in the said balancing chamber of said continual quick service valve means sufficiently to insure the sequential operation of the continual quick service valve means from its normal position to its operated position and back to its normal position.

3. A railway car fluid pressure brake apparatus as claimed in claim 1, further characterized by flow controlling means in the communication via which fluid under pressure is vented from said quick action chamber to said reset volume, said flow controlling means being operatively associated with the movable abutment of the quick service valve means such that upon restoration of said quick service valve means to its normal position said flow controlling means further restricts the flow of fluid under pressure through the communication between the quick action chamber and the reset volume.

4. A railway car fluid pressure brake apparatus as claimed in claim 1, further characterized by a back-dump valve means normally closing a communication between said supply reservoir and said brake pipe and being operatively associated with the movable abutment of said quick service valve means in a manner such that upon a predetermined differential of the pressure in the brake pipe chamber over the quick action chamber pressure said back-dump valve means moves to a position establishing the communication between said supply reservoir and the brake pipe to accelerate the build-up of pressure in the brake pipe, and flow controlling means in the communication between said quick action chamber and said reset volume, said flow controlling means being operative by the movable abutment of the puick service valve means upon restoration of the quick service valve means to its normal position to restrict the flow of fluid under pressure through the communication from the quick action chamber to the reset volume, thereby to prevent sufficient movement of the movable abutment of the quick service valve means to effect opening of said back dump valve means.

References Cited in the file of this patent
UNITED STATES PATENTS
2,994,565     McClure et al. _____ Aug. 1, 1961